US009368774B2

(12) United States Patent
Kumar et al.

(10) Patent No.: US 9,368,774 B2
(45) Date of Patent: Jun. 14, 2016

(54) ELECTROLYTE SEPARATOR AND METHOD OF MAKING THE ELECTROLYTE SEPARATOR

(75) Inventors: Sundeep Kumar, Bangalore (IN); Mohamed Rahmane, Ballston Lake, NY (US); Mohandas Nayak, Bangalore (IN); Arunabh Basak, Bangalore (IN); Kalaga Murali Krishna, Bangalore (IN); Atanu Saha, Bangalore (IN)

(73) Assignee: General Electric Company, Niskayuna, NY (US)

( * ) Notice: Subject to any disclaimer, the term of this patent is extended or adjusted under 35 U.S.C. 154(b) by 813 days.

(21) Appl. No.: 12/730,496

(22) Filed: Mar. 24, 2010

(65) Prior Publication Data
US 2011/0236743 A1 Sep. 29, 2011

(51) Int. Cl.
*H01M 2/16* (2006.01)
*H01M 10/39* (2006.01)

(52) U.S. Cl.
CPC ............ *H01M 2/1646* (2013.01); *H01M 10/39* (2013.01)

(58) Field of Classification Search
CPC .......................... H01M 2/1646; H01M 10/39
USPC .......................................... 429/144; 264/241
See application file for complete search history.

(56) References Cited

U.S. PATENT DOCUMENTS

| 3,791,871 | A | 2/1974 | Rowley | |
|---|---|---|---|---|
| 5,194,337 | A * | 3/1993 | Yoshida et al. | 428/426 |
| 5,837,398 | A | 11/1998 | Adams et al. | |
| 7,255,961 | B2 * | 8/2007 | Schucker | 429/129 |
| 2009/0005824 | A1 * | 1/2009 | Visco et al. | 607/3 |
| 2009/0011331 | A1 | 1/2009 | Stringer et al. | |
| 2009/0317724 | A1 * | 12/2009 | Kumar et al. | 429/320 |

* cited by examiner

*Primary Examiner* — Mark F Huff
*Assistant Examiner* — Monique Wills
(74) *Attorney, Agent, or Firm* — Francis T. Coppa (57) ABSTRACT

An electrolyte separator structure is provided. The electrolyte separator structure comprises a graded integral structure, wherein the structure comprises an ion-conducting first ceramic at a first end and an electrically insulating second ceramic at a second end, wherein the difference in the coefficient of thermal expansion of the ion-conducting first ceramic and the electrically insulating second ceramic is less than or equal to about 5 parts per million per degrees Centigrade, and wherein at least one of the first ceramic or the second ceramic comprises a strengthening agent. Method of making the ion-separator structure is provided. Electrochemical cells comprising the ion-separator structure and method of making the electrochemical cell using the ion-separator structure are also provided.

11 Claims, 7 Drawing Sheets

ELECTROLYTE SEPARATOR AND METHOD OF MAKING THE ELECTROLYTE SEPARATOR

BACKGROUND

1. Technical Field

The invention includes embodiments that relate to an electrolyte separator structure such as that used for an energy storage device. The invention includes embodiments that relate to a graded integral structure for use as an electrolyte separator structure in an energy storage device. The invention includes embodiments that relate to a method of making the electrolyte separator structure for an energy storage device.

2. Discussion of Related Art

Development work has been undertaken on high temperature rechargeable batteries using sodium for the negative electrode. The liquid sodium negative electrode is separated from a positive electrode by a sodium-ion-conducting solid electrolyte. Suitable material includes beta-alumina and beta"-alumina, known together as beta-alumina solid electrolyte (BASE), which is used as the separator of electrodes. Some electrochemical cells have a metallic casing. The ceramic parts of the cell can be joined or bonded via a sealing material. The sealing material may include a glassy material having undesirable characteristics associated with its use. Bonded ceramic parts formed from dissimilar materials in a high temperature cell may crack due to thermal stress caused by mismatch in the coefficient of thermal expansion. The coefficient of thermal expansion for two ceramic parts can be substantially dissimilar. The sealing material may have a limited life, and bond failure or degradation may cause cell failure due to a direct conduction path between the cathode and anode electrodes.

It may be desirable to have a graded integral structure for use as electrolyte separator structure in an energy storage device that removes the need for sealing materials that are currently necessary. It may be desirable to have a seal structure that differs from those seal structures that are currently available. It may be desirable to have a method of sealing an energy storage device that differs from those methods that are currently available.

BRIEF DESCRIPTION

In accordance with an embodiment of the invention, an electrolyte separator structure is provided. The electrolyte separator structure comprises a graded integral structure. The graded integral structure comprises an ion-conducting first ceramic at a first end and an electrically insulating second ceramic at a second end. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent.

In accordance with an embodiment of the invention, a method is provided that is capable of forming an electrolyte separator structure for an energy storage device. The method comprises selecting an ion-conducting first ceramic and an electrically insulating second ceramic. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent. The method further comprises partially filling a mold with a first material comprising the ion-conducting first ceramic and filling the remaining portion of the mold with a second material comprising the electrically insulating second ceramic, applying a pressure to the mold to form a green body, sintering the green body at a temperature to form a graded integral structure comprising the ion-conducting first ceramic at a first end and the electrically insulating second ceramic at a second end.

In accordance with an embodiment of the invention, an electrochemical cell is provided. The electrochemical cell comprises an electrolyte separator structure comprising a graded integral structure, wherein the graded integral structure comprises an ion-conducting first ceramic at a first end and an electrically insulating second ceramic at a second end. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent.

In accordance with another embodiment of the invention, an electrochemical cell is provided. The electrochemical cell comprises an electrolyte separator structure. The electrolyte separator structure comprises a graded integral structure comprising a closed first end and an open second end. The graded integral structure comprises an ion-conducting first ceramic at the closed first end and an electrically insulating second ceramic at the open second end, wherein the open second end of the graded integral structure is fitted with a collar. The collar comprises a cermet layer, and a layer of an electrically insulating ceramic. The electrically insulating layer in the collar is disposed at the electrically insulating second ceramic located at the open second end of the graded integral structure. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent.

In accordance with another embodiment of the invention, a method is provided. The method comprises forming a graded integral structure comprising an ion-conducting first ceramic and an electrically insulating second ceramic. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent. The graded integral structure comprises a closed first end and an open second end. The graded integral structure comprises an ion-conducting first ceramic at the closed first end and an electrically insulating second ceramic at the open second end. The open second end of the structure is fitted with a collar. The collar comprises a cermet layer, and a layer of an electrically insulating ceramic. The method further comprises sintering the graded integral structure and the collar at a temperature to form a joint between the layer of the electrically insulating ceramic in the collar and the electrically insulating second ceramic at the open second end.

DETAILED DESCRIPTION

The invention includes embodiments that relate to an electrolyte separator structure for an energy storage device. The invention includes embodiments that relate to a graded integral structure for use as an electrolyte separator structure in an energy storage device. The invention includes embodiments that relate to a method of making the electrolyte separator structure for an energy storage device.

High temperature rechargeable electrochemical cells known in the art have various applications that subject them to mechanical stresses and thermal stresses. Additionally, the ceramic parts used in the rechargeable batteries need to be joined, and the sealing materials known in the art for use in joining or bonding the ceramic parts typically show reduced resistance to corrosion from the anodic and cathodic materials. For example, in a typical high temperature rechargeable electrochemical cell like a sodium-metal halide cell, the sealing glasses are subject to corrosion due to the sodium in the anode compartment and the halide in the cathode compartment. The corrosion in addition to the mechanical and thermal stresses further weakens the joints, hence accelerating the cell failure.

Embodiments of the invention described herein address the noted shortcomings of the state of the art. The electrolyte separator structure includes a graded integral structure. The graded integral structure comprises an ion-conducting first ceramic at a first end and an electrically insulating second ceramic at other end. The graded structure is formed such that the difference in the co-efficient of thermal expansion of the ion-conducting first ceramic and the electrically insulating second ceramic is less than or equal to about 5 parts per million per degrees Centigrade. Further, at least one of the first ceramic or the second ceramic comprises a strengthening agent. The graded integral-structure negates the need for a joint formed using a sealing glass between the ion-conducting first ceramic and the electrically insulating second ceramic, thus reducing the probability of cell failure due to corrosion of the sealing material in the joints. Further, the graded integral structure is a monolithic structure having minimized stress on account of reduced mechanical and thermal stresses.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components unless otherwise stated. As used herein, the terms "disposed over" or "deposited over" or "disposed between" refers to both secured or disposed directly in contact with and indirectly by having intervening layers therebetween.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

As used herein, cathodic material is the material that supplies electrons during charge and is present as part of a redox reaction. Anodic material accepts electrons during charge and is present as part of the redox reaction.

As used herein, a "graded integral structure" means a monolithic structure comprising at least two different materials whose composition is varied in a gradual predetermined or intentional manner across a specified length of the structure which forms the interface between the at least two materials. The formalism for this change in composition could take any functional form including a curve, step-wise, linear, or polynomial expression. A monolithic structure as used herein is a single block or piece comprising at least two different materials one at each end of the structure, as distinguished from a part made by fusing or bonding multiple parts together.

In accordance with an embodiment of the invention, an electrolyte separator structure is provided. The electrolyte separator structure comprises a graded integral structure. The graded integral structure comprises an ion-conducting first ceramic at a first end and an electrically insulating second ceramic at a second end. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent. The electrolyte separator structure of the present invention makes it possible to construct a high temperature rechargeable electrochemical cell with a long lifetime.

In one embodiment, the ion-conducting first ceramic comprises beta-alumina. In one embodiment, the electrically insulating second ceramic comprises one or more of alpha-alumina, yttria, yttria stabilized zirconia, yttrium aluminum garnet, magnesia alumina spinel, and yttrium aluminate perovskite. In one embodiment, the first ceramic comprises alpha-alumina. In one embodiment, about 80 percent to about 99 percent of the graded integral structure, based on the total length of the graded integral structure, comprises the ion-conducting first ceramic. In another embodiment, about 85 percent to about 98.5 percent of the graded integral structure, based on the total length of the graded integral structure, comprises the ion-conducting first ceramic. In yet another embodiment, about 95 percent to about 98 percent of the graded integral structure, based on the total length of the graded integral structure, comprises the ion-conducting first ceramic.

In one embodiment, about 1 percent to about 20 percent of the graded integral structure, based on the total length of the graded integral structure, comprises the electrically insulating second ceramic. In another embodiment, about 1.5 percent to about 15 percent of the graded integral structure, based on the total length of the graded integral structure comprises the electrically insulating second ceramic. In yet another embodiment, about 2 percent to about 5 percent of the graded integral structure, based on the total length of the graded integral structure comprises the electrically insulating second ceramic.

In one embodiment, as mentioned above, the difference in the coefficient of thermal expansion of the ion-conducting first ceramic and the electrically insulating second ceramic is less than or equal to about 5 parts per million per degrees Centigrade. In one embodiment, the difference in the coefficient of thermal expansion of the ion-conducting first ceramic and the electrically insulating second ceramic is in a range from about 0.001 parts per million per degrees Centigrade to about 5 parts per million per degrees Centigrade. In another embodiment, the difference in the coefficient of thermal expansion of the ion-conducting first ceramic and the electrically insulating second ceramic is in a range from about 0.01 parts per million per degrees Centigrade to about 4 parts per million per degrees Centigrade. In yet another embodiment, the difference in the coefficient of thermal expansion of the ion-conducting first ceramic and the electrically insulating second ceramic is in a range from about 0.1 parts per million per degrees Centigrade to about 2 parts per million per degrees Centigrade.

As discussed above, at least one of the first ion-conducting ceramic and the electrically insulating second ceramic comprises a strengthening agent. In one embodiment, both the first ceramic and the second ceramic comprise a strengthening agent. The strengthening agent provides resistance to formation and propagation of crack via different mechanisms including but not limited to crack branching, crack bowing, transformation toughening, crack bridging, and crack deflections. The strengthening agent does not chemically interact with the first ceramic or the second ceramic phase during processing. The strengthening agent may help to physically bind the ceramic phases together and thus may assist in minimizing crack formation or propagation.

Suitable examples of the strengthening agent as described in any of the embodiments herein include agents that comprise an oxide, a nitride, or a carbide of at least one element selected from the group consisting of group IIIA elements, group IIIB elements, group IVB elements, and group IVB elements. In one embodiment, the strengthening agent is selected from one or more of zirconia, yttria stabilized zirconia, boron carbide, silicon carbide, silicon nitride, titanium carbide, hafnia, and ceria. In one embodiment, the strengthening agent is zirconia. In one embodiment, the strengthening agent is yttria stabilized zirconia.

In one embodiment, the amount of strengthening agent used in the first ceramic is in a range from about 1 volume percent to about 50 volume percent based on the amount of the first ceramic. In another embodiment, the amount of strengthening agent used in the first ceramic is in a range from about 2 volume percent to about 30 volume percent based on the amount of the first ceramic. In yet another embodiment, the amount of strengthening agent used in the first ceramic is in a range from about 3 volume percent to about 15 volume percent based on the amount of the first ceramic.

In one embodiment, the amount of strengthening agent used in the second ceramic is in a range from about 1 volume percent to about 50 volume percent based on the amount of the second ceramic. In another embodiment, the amount of strengthening agent used in the second ceramic is in a range from about 2 volume percent to about 30 volume percent based on the amount of the second ceramic. In yet another embodiment, the amount of strengthening agent used in the second ceramic is in a range from about 3 volume percent to about 15 volume percent based on the amount of the second ceramic.

In one embodiment, when the strengthening agent is present in the first ceramic and the second ceramic, the ratio of the amount of the strengthening agent present in the first ceramic to the amount of the strengthening agent in the second ceramic is in a range from about 1:0.2 to about 1:5. In another embodiment, the ratio is in a range from about 1:0.3 to about 1:3. In yet another embodiment, the ratio is in a range from about 1:0.5 to about 1:2.

In accordance with an embodiment of the invention, a method is provided that is capable of forming an electrolyte separator structure for an energy storage device. The method comprises selecting an ion-conducting first ceramic and an electrically insulating second ceramic. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent as described previously. The method further comprises partially filling a mold with a first material comprising the ion-conducting first ceramic and filling the remaining portion of the mold with a second material comprising the electrically insulating second ceramic, applying a pressure to the mold to form a green body, sintering the green body at a temperature to form a graded integral structure comprising the ion-conducting first ceramic at a first end and the electrically insulating second ceramic at a second end.

In one embodiment, the first material may be in the form of a powder, paste, slurry, or a gel. In one embodiment, the first material is in the form of a powder. In one embodiment, the second material may be in the form of a powder, paste, slurry, or a gel. In one embodiment, the second material is in the form of a powder. In certain embodiments, the first material and the second material are in the form of a powder.

As known in the art, materials exhibit varying sintering kinetics. The variation in sintering kinetics may in some embodiments depend on the particle size of the materials being employed. As used herein the phrase "sintering kinetics" means the percentage shrinkage of a material and the rate of shrinkage of the material with change in temperature.

Figure 1:
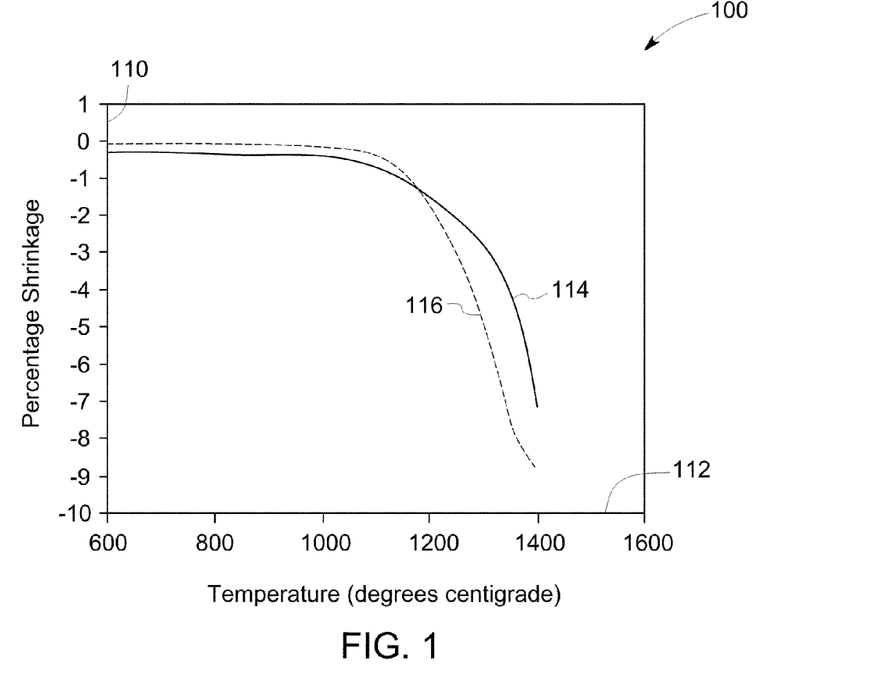
FIG. 1 is a schematic view showing a graph of difference in densification behavior in accordance with one embodiment of the invention.

Referring to FIG. 1, a graph 100 showing the sintering kinetics in terms of percentage shrinkage 110 with an increase in temperature 112 is shown. Curve 114 indicates the percentage shrinkage and rate of shrinkage of beta-alumina with increase in temperature, for beta-alumina having an average particle size of about 1.5 micrometer. Curve 116 indicates the percentage shrinkage and rate of shrinkage of alpha-alumina with increase in temperature, for alpha-alumina having an average particle size of about 0.15 micrometer. The percentage shrinkage and rate of shrinkage of beta-alumina or alpha-alumina with increase in temperature may be termed as the "densification behavior" of beta-alumina or alpha-alumina. Densification behavior includes the onset of densification as well as the rate of densification. The graph 100 indicates that the difference in densification behavior results in different sintering kinetics for alpha-alumina and beta-alumina. In one embodiment, employing materials having identical, or similar, densification behaviors may assist during sintering as it may assist in minimizing or avoiding the residual stresses arising from the difference in sintering behavior.

Figure 2:
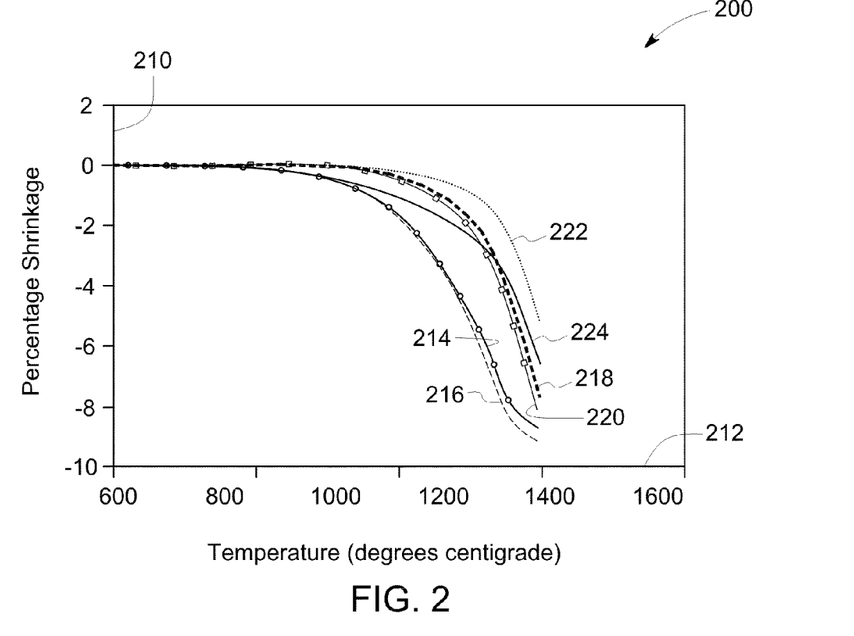
FIG. 2 is a schematic view showing a graph of effect of particle size in accordance with one embodiment of the invention.

Referring to FIG. 2, a graph 200 showing the sintering kinetics in terms of percentage shrinkage 210 with change in temperature 212 is shown. One skilled in the art may be aware that the particle size varies when alpha-alumina is heat treated. Curves 214, 216, 218, 220 and 222 were obtained using alpha-alumina pellets heat treated at varying temperature-time profiles. A Curve 214 (alpha-alumina not heat treated, initial particle size 0.15 micrometer), Curve 216 (alpha-alumina heated for 1000 degrees Centigrade for 6 hours), Curve 218 (alpha-alumina heated for 1250 degrees Centigrade for 6 hours), Curve 220 (alpha-alumina heated for 1300 degrees Centigrade for 2 hours) and Curve 222 (alpha-alumina heated for 1350 degrees Centigrade for 2 hours in a furnace in an atmosphere of air, and milled in a ball-mill using zirconia balls as grinding media with iso-propanol in plastic jars). Curves obtained for varying particle sizes of alpha-alumina 214, 216, 218, 220 and 222 and Curve 224 obtained for beta-alumina having an average particle size of 1.5 micrometer clearly indicate that the sintering kinetics i.e., the percentage shrinkage and rate of shrinkage with change in temperature for alpha-alumina and beta-alumina is considerably different. As shown in FIG. 2, choosing the appropriate particle size of the alpha-alumina and beta-alumina may result in matching the densification behavior of the alpha-alumina and beta-alumina and hence assist in minimizing or avoiding the residual stresses arising from the difference in sintering behavior.

Figure 3:
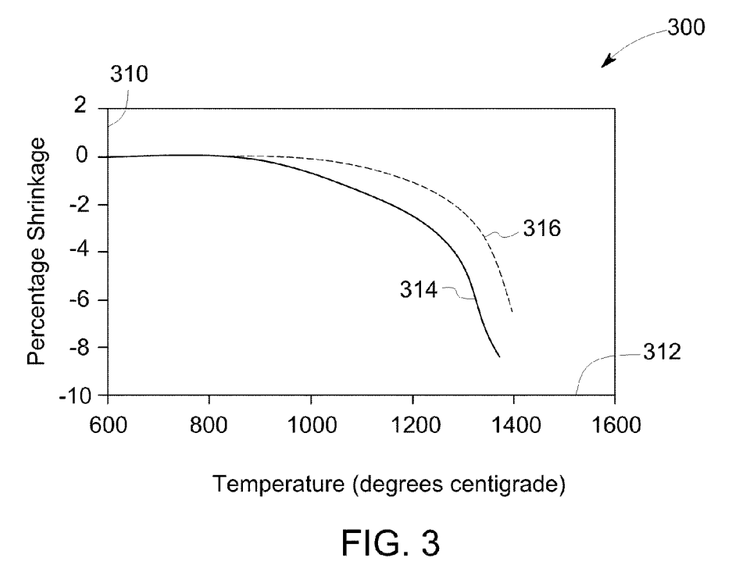
FIG. 3 is a schematic view showing a graph of effect of strengthening agent in accordance with one embodiment of the invention.

As discussed above, at least one of the first ion-conducting ceramic and the electrically insulating second ceramic comprises a strengthening agent. The strengthening agents also help to tune the densification behavior of the ceramics. Referring to FIG. 3, a graph 300 showing the sintering kinetics of beta-alumina in terms of percentage shrinkage 310 with increase in temperature 312 is shown. Curve 314 indicates the percentage shrinkage and rate of shrinkage of beta-alumina comprising 20 volume percent of yttria stabilized zirconia (8 mole percent of yttria in zirconia; yttria stabilized zirconia had an average particle size of 0.6 micrometers) as the strengthening agent and Curve 316 indicates the percentage shrinkage and rate of shrinkage of beta-alumina without the strengthening agent. Curve 314 indicates that the percentage shrinkage and rate of shrinkage of beta-alumina comprising strengthening agent is greater than the percentage shrinkage and rate of shrinkage of beta-alumina without strengthening agent as indicated by Curve 316. As shown in FIG. 3, choosing the appropriate strengthening agent and its average particle size may assist in tuning the rate of shrinkage and hence assist in matching the densification behavior of the beta-alumina with the alpha-alumina.

Figure 4:
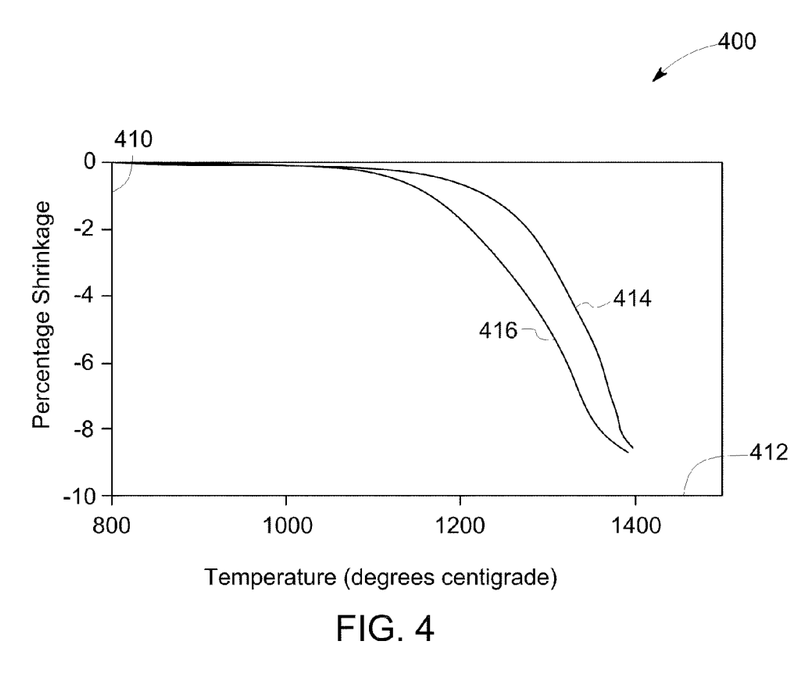
FIG. 4 is a schematic view showing a graph of effect of strengthening agent in accordance with one embodiment of the invention.

Referring to FIG. 4, a graph 400 showing the sintering kinetics of alpha-alumina in terms of percentage shrinkage 410 with increase in temperature 412 is shown. Curve 414 indicates the percentage shrinkage and rate of shrinkage of alpha-alumina comprising 20 volume percent of yttria stabilized zirconia (8 mole percent of yttria in zirconia; yttria stabilized zirconia had an average particle size of 0.6 micrometers) as the strengthening agent and curve 416 indicates the percentage shrinkage and rate of shrinkage of alpha-alumina without the strengthening agent. Curve 414 indicates the percentage shrinkage and rate of shrinkage of alpha-alumina with strengthening agent is greater than the percentage shrinkage and rate of shrinkage of alpha-alumina without strengthening agent as indicated by Curve 416. As shown in FIG. 4, choosing the appropriate strengthening agent may assist in tuning the rate of shrinkage and hence assist in matching the densification behavior of the alpha-alumina with beta-alumina. In one embodiment, mismatch in the sintering behavior may lead to residual stress leading to formation of defects at the interface.

In various embodiments, as discussed above, doing one or more of matching the particle size and using an appropriate strengthening agent assists in controlling the percentage shrinkage and rate of shrinkage i.e., the densification behavior of the alpha and beta-alumina with increase in temperature during the sintering step. However, during cooling from sintering temperature to room temperature after the sintering step, a coefficient of thermal expansion mismatch becomes a predominant factor. Mismatch in the coefficient of thermal expansion may lead to residual stresses leading to formation of defects at the interface after cooling.

In one embodiment, the first material comprises beta-alumina. In one embodiment, the first material is a powder having an average particle size in a range from about 0.1 micrometers to about 10 micrometers. In another embodiment, the first material is a powder having an average particle size in a range from about 1 micrometer to about 9 micrometers. In yet another embodiment, the ion-conducting first material is a powder having an average particle size in a range from about 2 micrometers to about 8 micrometers.

In one embodiment, the second material comprises one or more of alpha-alumina, yttria, yttria stabilized zirconia, yttrium aluminum garnet, magnesia alumina spinel, and yttrium aluminate perovskite. In one embodiment, the second material is a powder having an average particle size in a range from about 0.02 micrometers to about 10 micrometers. In another embodiment, the second material is a powder having an average particle size in a range from about 0.1 micrometers to about 9 micrometers. In yet another embodiment, the second material is a powder having an average particle size in a range from about 0.2 micrometers to about 8 micrometers. As used herein the phrase "particle size" means the size of un-agglomerated primary particles consisting of one or more crystallite. The crystallite size is the size of a single crystal inside a particle. A single particle can be composed of several crystals.

In one embodiment, the strengthening agent has an average particle size in a range from about 0.02 micrometers to about 10 micrometers with an aspect ratio in range from about 1 to about 10. As used herein, the phrase "aspect ratio of a particle" is the ratio of longer dimension of the particle to its shorter dimension. In another embodiment, the strengthening agent has an average particle size in a range from about 0.01 micrometers to about 9 micrometers with an aspect ratio in range from about 1 to about 10. In yet another embodiment, the strengthening agent has an average particle size in a range from about 0.02 micrometers to about 8 micrometers with an aspect ratio in range from about 1 to about 10.

In one embodiment, the amount of strengthening agent used with the first material is in a range from about 1 volume percent to about 50 volume percent based on the amount of the first material. In another embodiment, the amount of strengthening agent used with the first material is in a range from about 2 volume percent to about 30 volume percent based on the amount of the first material. In yet another embodiment, the amount of strengthening agent used with the first material is in a range from about 3 volume percent to about 15 volume percent based on the amount of the first material.

In one embodiment, the amount of strengthening agent used with the second material is in a range from about 1 volume percent to about 50 volume percent based on the amount of the second material. In another embodiment, the amount of strengthening agent used with the second material is in a range from about 2 volume percent to about 30 volume percent based on the amount of the second material. In yet another embodiment, the amount of strengthening agent used with the second material is in a range from about 3 volume percent to about 15 volume percent based on the amount of the second material.

In one embodiment, the first material comprises beta-alumina powder. In one embodiment, the second material comprises alpha-alumina powder. In one embodiment, about 80 percent to about 99 percent of the mold at a first end based on the total length of the mold is filled with the first powder. In another embodiment, about 85 percent to about 98.5 percent of the mold at a first end based on the total length of the mold is filled with the first powder. In yet another embodiment, about 95 percent to about 98 percent of the mold at a first end based on the total length of the mold is filled with the first powder.

In one embodiment, about 1 percent to about 20 percent of the mold at a second end based on the total length of the mold is filled with the second powder. In another embodiment, about 1.5 percent to about 15 percent of the mold at a second end based on the total length of the mold is filled with the second powder. In yet another embodiment, about 2 percent to about 5 percent of the mold at a second end based on the total length of the mold is filled with the second powder.

In various embodiments, the green body comprising the ion-conducting first ceramic, the electrically insulating second ceramic, and the strengthening agent, may be formed by methods known to one skilled in the art. In one embodiment, the green body may be formed by uni-axial pressing, isostatic pressing, slip casting, tape casting, or pressure filtering the first material and the second material in the mold In one embodiment, the pressure applied for forming the green body is in a range from about $2 \times 10^7$ Newtons per square meter to about $4 \times 10^7$ Newtons per square meter. In another embodiment, the pressure applied for forming the green body is in a range from about $2.1 \times 10^7$ Newtons per square meter to about $3.9 \times 10^7$ Newtons per square meter. In yet another embodiment, the pressure applied for forming the green body is in a range from about $2.2 \times 10^7$ Newtons per square meter to about $3.8 \times 10^7$ Newtons per square meter.

In one embodiment, the temperature at which the green body is sintered is in a range from about 1200 degrees Centigrade to about 1800 degrees Centigrade. In another embodiment, the temperature at which the green body is sintered is in a range from about 1300 degrees Centigrade to about 1700 degrees Centigrade. In yet another embodiment the temperature at which the green body is sintered is in a range from about 1400 degrees Centigrade to about 1600 degrees Centigrade.

Figure 5:
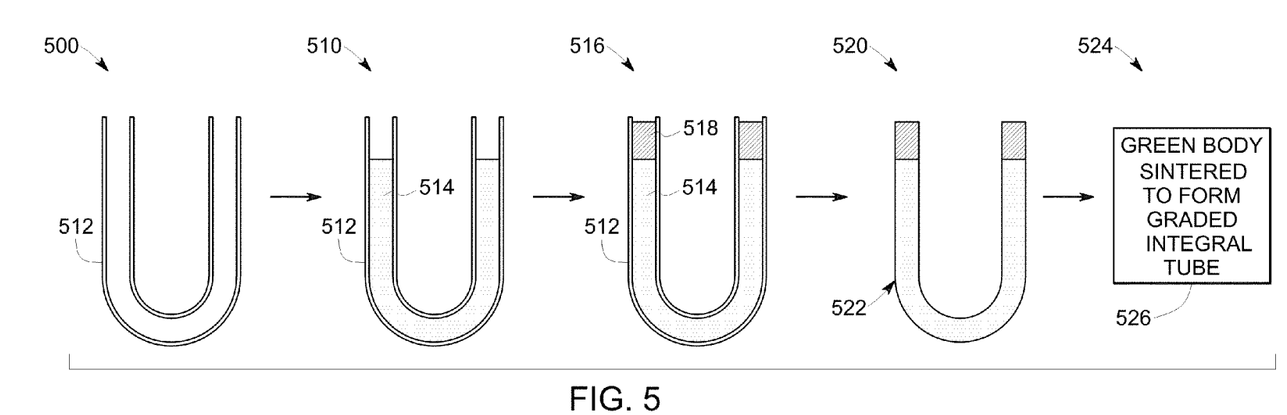
FIG. 5 is a schematic view of a method of making a graded integral structure in accordance with an embodiment of the invention.

Referring to FIG. 5, a schematic view of a method 500 of making a graded integral structure in accordance with an embodiment of the invention is provided. In a first step 510, a mold 512 is partially filled with a pre-determined quantity of a first material 514 comprising an ion-conducting first ceramic. In a second step, 516 the mold 512 is filled with a pre-determined quantity of a second material 518 comprising an electrically insulating second ceramic. The mold is tapped after filling the first material and after filling the second material to minimize air gaps and ensure proper filling of the materials. In one embodiment, the first material 514 may comprise a strengthening agent (not shown in figure). In one embodiment, the second material 518 may comprise a strengthening agent (not shown in figure). In one embodiment, the first material 514 and the second material 518 may both comprise a strengthening agent (not shown in figure). In a third step 520 the powder in the mold is compressed at a pressure to form a green body 522. In a fourth step 524, the green body 522 is sintered at a temperature to form the graded integral structure 526. In another embodiment, the third step 520 and the fourth step 524 may be carried out simultaneously. Other ceramic methods that may be employed to form the graded integral structure include extrusion, injection molding, and casting.

Figure 6:
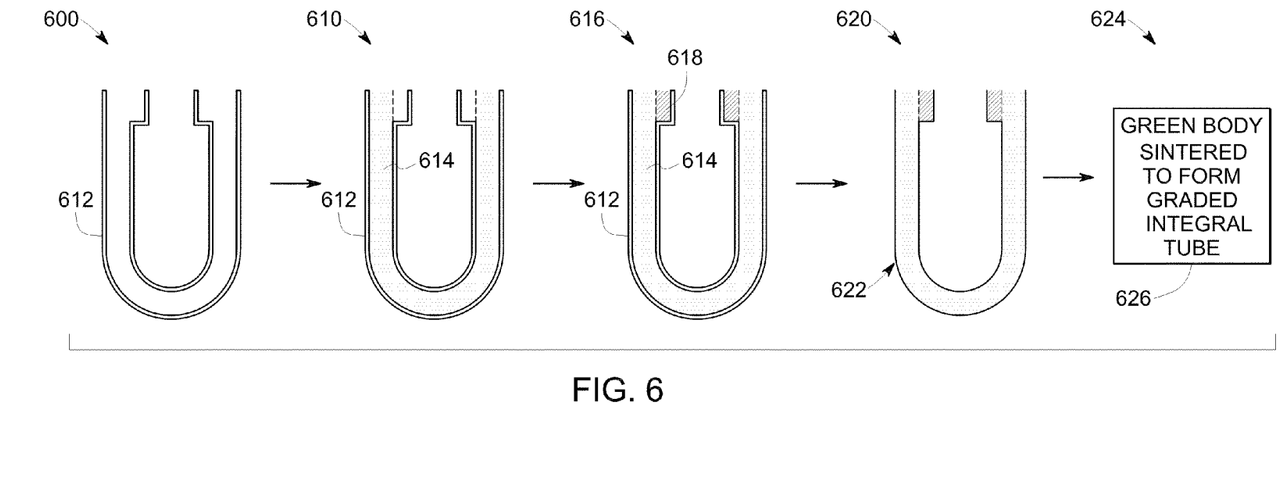
FIG. 6 is a schematic view of a method of making a graded integral structure in accordance with an embodiment of the invention.

Referring to FIG. 6, a schematic view of a method 600 of making a graded integral structure in accordance with an embodiment of the invention is provided. In a first step 610, a mold 612 is partially filled with a pre-determined quantity of a first material 614 comprising an ion-conducting first ceramic. In a second step, 616 the mold 612 is filled with a pre-determined quantity of a second material 618 comprising an electrically insulating second ceramic. The mold is tapped after filling the first material and after filling the second material to minimize air gaps and ensure proper filling of the materials. In one embodiment, the first material 614 may comprise a strengthening agent (not shown in figure). In one embodiment, the second material 618 may comprise a strengthening agent (not shown in figure). In one embodiment, the first material 614 and the second material 618 may both comprise a strengthening agent (not shown in figure). In a third step 620 the powder in the mold is compressed at a pressure to form a green body 622. In a fourth step 624, the green body 622 is sintered at a temperature to form the graded integral structure 626. In another embodiment, the third step 620 and the fourth step 624 may carried out simultaneously. As shown in FIG. 5 and FIG. 6, the mold employed can be of any shape that can have a utility, say for example, a 'U' shaped structure to be used as an electrolyte separator structure in an electrochemical cell.

In accordance with an embodiment of the invention, an electrochemical cell is provided. The electrochemical cell comprises an electrolyte separator structure comprising a graded integral structure, wherein the graded integral structure comprises an ion-conducting first ceramic at a first end and an electrically insulating second ceramic at a second end. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent.

In accordance with another embodiment of the invention, an electrochemical cell is provided. The electrochemical cell comprises an electrolyte separator structure. The electrolyte separator structure comprises a graded integral structure comprising a closed first end and an open second end. The graded integral structure comprises an ion-conducting first ceramic at the closed first end and an electrically insulating second ceramic at the open second end, wherein the open second end of the graded integral structure is fitted with a collar. The collar comprises a cermet layer, and a layer of an electrically insulating ceramic. The electrically insulating layer in the collar is disposed at the electrically insulating second ceramic located at the open second end of the graded integral structure. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent.

Figure 7:
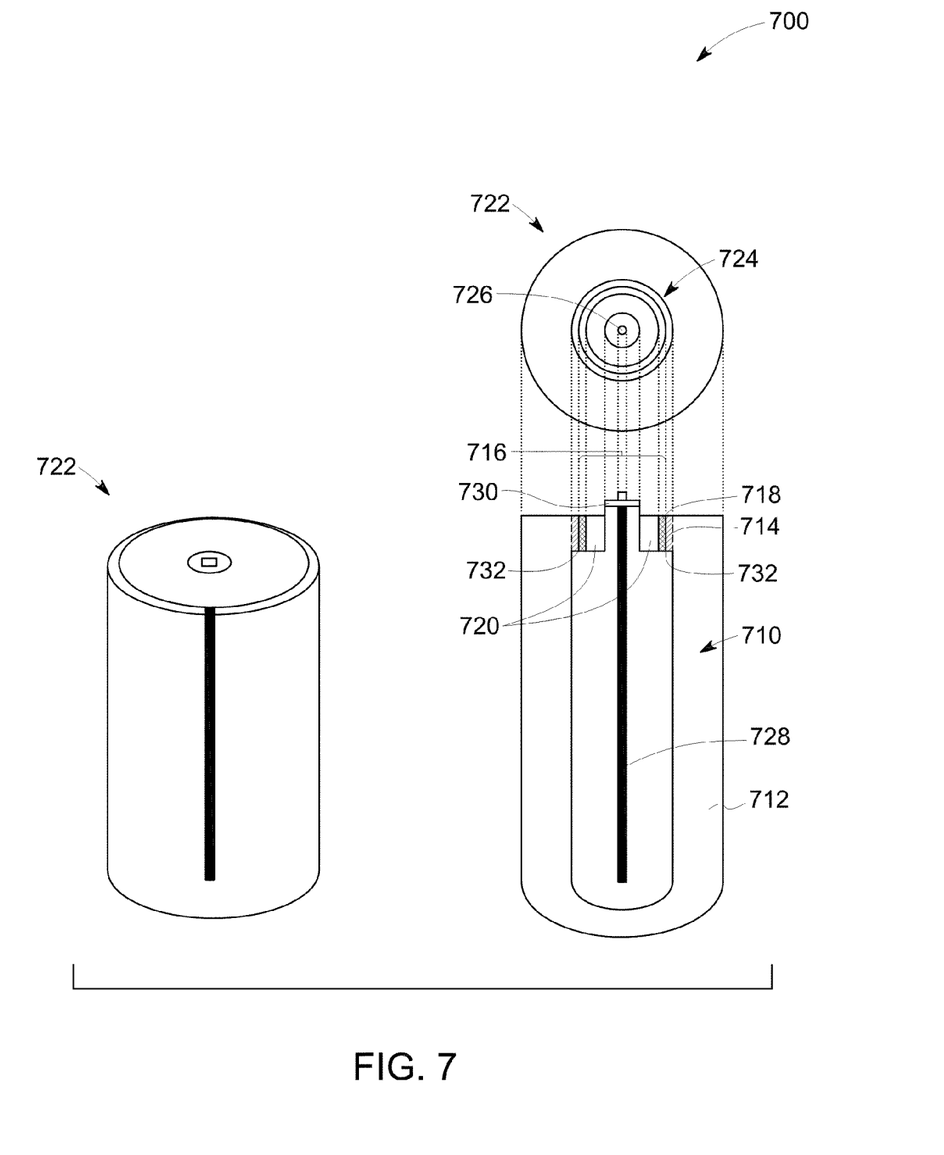
FIG. 7 is a schematic view showing a cross section of an electrochemical cell in accordance with an embodiment of the invention.

Referring to FIG. 7, a schematic view showing a cross section of an electrochemical cell 700, in accordance with an embodiment of the invention is provided. The electrochemical cell 700, includes a graded integral structure 710 (prepared in a manner as described in FIG. 6), comprising an ion-conducting first ceramic 712 at the closed first end and an electrically insulating second ceramic at the open second end 714. The ion-conducting first ceramic 712 comprises beta-alumina. The electrically insulating second ceramic comprises alpha-alumina 714. The open second end of the structure comprising the electrically insulating second ceramic 714 is fitted with a collar 716. The collar comprises a layer of an electrically insulating ceramic 718 and a cermet layer 720. The cross section 722 of the graded integral structure 710 is circular. The collar is also fabricated in a circular shape 724 in the form of a disc with the dimensions that allow the collar to be fitted inside the open second end of the graded integral structure 710. The collar has an opening 726 in the center though which the cathodic material (not shown in figure) and the cathode 728 are inserted inside the graded integral structure 710. The central open portion 726 of the collar is then covered with a metal cap 730. After the collar is fitted into the open second end 714 of the graded integral structure 710, the assembly comprising the graded integral structure and the collar is sintered using methods known in the art, resulting in the formation of a bond 732 between the electrically insulating second ceramic present in the open second end 714 of the graded integral structure 710 and the electrically insulating second ceramic 718 in the collar 716, thus joining the collar 716 and the structure 710. The metal cap 730 is then welded to the cermet layer 720 in the collar 716 using methods known in the art.

Figure 8:
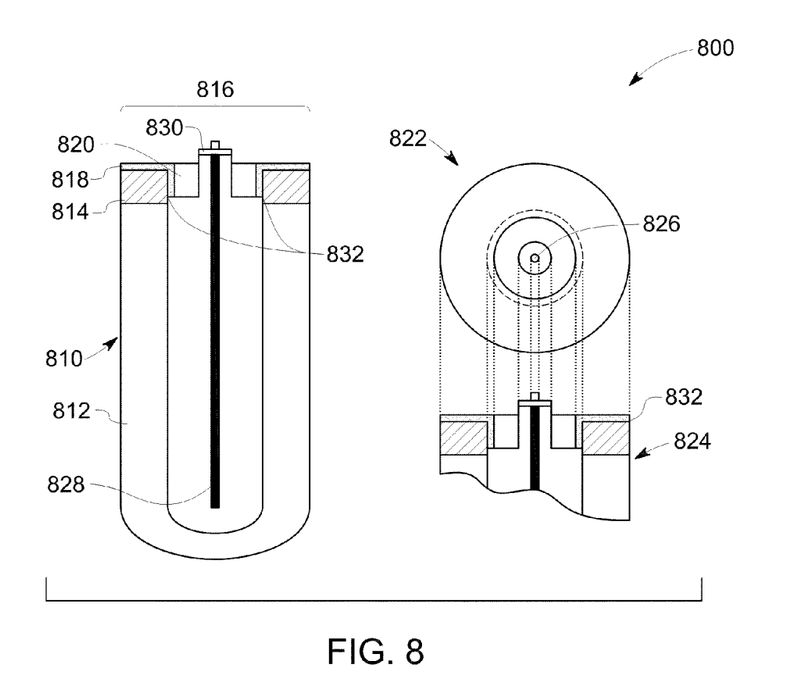
FIG. 8 is a schematic view showing a cross section of an electrochemical cell in accordance with an embodiment of the invention.

Referring to FIG. 8, a schematic view showing a cross section of an electrochemical cell 800, in accordance with an embodiment of the invention is provided. The electrochemical cell 800, includes a graded integral structure 810 (prepared in a manner as described in FIG. 6), comprising an ion-conducting first ceramic 812 at the closed first end and an electrically insulating second ceramic at the open second end 814. The ion-conducting first ceramic 812 comprises beta-alumina. The electrically insulating second ceramic comprises alpha-alumina 814. The open second end of the structure comprising the electrically insulating second ceramic 814 is fitted with a collar 816. The collar comprises a layer of an electrically insulating ceramic 818 and a cermet layer 820. The cross section 822 of the graded integral structure 810 is circular. The collar 816 is fabricated in a "T" shaped design with a circular cross-section 824 with dimensions that allow the collar to be fitted inside the open second end of the graded integral structure 810. The collar has an opening 826 in the center though which the cathodic material (not shown in figure) and the cathode 828 are inserted inside the graded integral structure 810. The central open portion 826 of the collar is then covered with a metal cap 830. After the collar is fitted into the open second end 814 of the graded integral structure 810, the assembly comprising the graded integral structure and the collar is sintered using methods known in the art, resulting in the formation of a bond 832 between the electrically insulating second ceramic present in the open second end 814 of the graded integral structure 810 and the electrically insulating second ceramic 818 in the collar 816, thus joining the collar 816 and the structure 810. The metal cap 830 is then welded to the cermet layer 820 in the collar 816 using methods known in the art.

Figure 9:
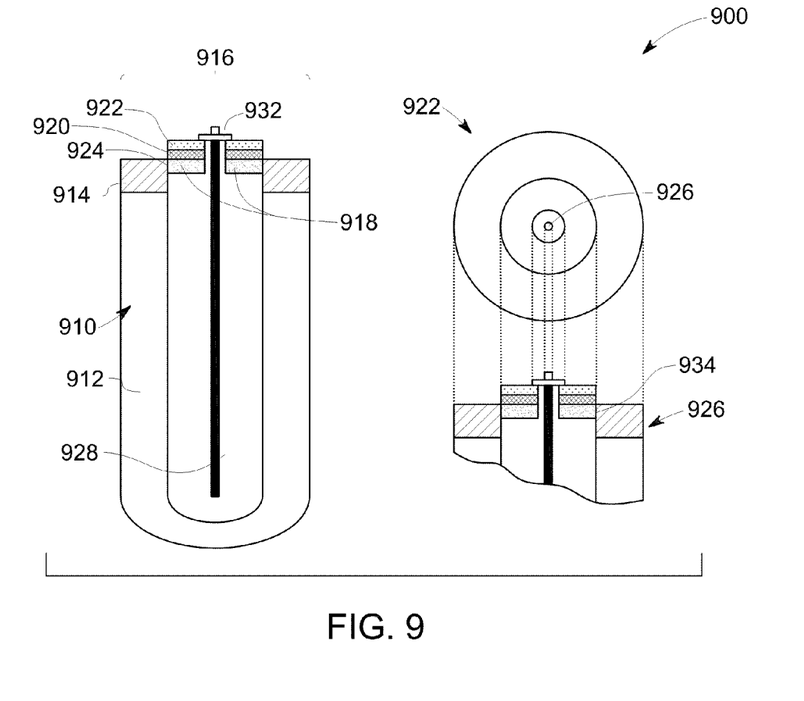
FIG. 9 is a schematic view showing a cross section of an electrochemical cell in accordance with an embodiment of the invention.

Referring to FIG. 9, a schematic view showing a cross section of an electrochemical cell 900, in accordance with an embodiment of the invention is provided. The electrochemical cell 900, includes a graded integral structure 910 (prepared in a manner as described in FIG. 6), comprising an ion-conducting first ceramic 912 at the closed first end and an electrically insulating second ceramic at the open second end 914. The ion-conducting first ceramic 912 comprises beta-alumina. The electrically insulating second ceramic comprises alpha-alumina 914. The open second end of the structure comprising the electrically insulating second ceramic 914 is fitted with a collar 916. The collar comprises a layer of an electrically insulating ceramic 918, a cermet layer 920, and a metal layer 922. The cross section 924 of the graded integral structure 910 is circular. The collar 916 is fabricated in with a circular cross-section 926 with dimensions that allow the collar to be fitted inside the open second end of the graded integral structure 910. The collar has an opening 928 in the center though which the cathodic material (not shown in figure) and the cathode 930 are inserted inside the graded integral structure 910. The central open portion 928 of the collar is then covered with a metal cap 932. After the collar is fitted into the open second end 914 of the graded integral structure 910, the assembly comprising the graded integral structure and the collar is sintered using methods known in the art, resulting in the formation of a bond 934 between the electrically insulating second ceramic present in the open second end 914 of the graded integral structure 910 and the electrically insulating second ceramic 918 in the collar 916, thus joining the collar 916 and the structure 910. The metal cap 932 is then welded to the metal layer 922 in the collar 916 using methods known in the art.

In accordance with another embodiment of the invention, a method is provided. The method comprises forming a graded integral structure comprising an ion-conducting first ceramic and an electrically insulating second ceramic. The difference in the coefficient of thermal expansion of the ion-conducting first ceramic and the electrically insulating second ceramic is less than or equal to about 5 parts per million per degrees Centigrade. At least one of the first ceramic or the second ceramic comprises a strengthening agent. The graded integral structure comprises a closed first end and an open second end. The graded integral structure comprises an ion-conducting first ceramic at the closed first end and an electrically insulating second ceramic at the open second end. The open second end of the structure is fitted with a collar. The collar comprises a cermet layer, and a layer of an electrically insulating ceramic. The method further comprises sintering the graded integral structure and the collar at a temperature to form a joint between the layer of the electrically insulating ceramic in the collar and the electrically insulating second ceramic at the open second end.

In one embodiment, forming the graded integral structure comprises selecting an ion-conducting first ceramic and an electrically insulating second ceramic; wherein the difference in the coefficient of thermal expansion of the ion-conducting first ceramic and the electrically insulating second ceramic is less than or equal to about 5 parts per million per degrees Centigrade, and wherein at least one of the first ceramic or the second ceramic comprises a strengthening agent; partially filling a mold with a first material comprising the ion-conducting first ceramic powder and filling the remaining portion of the mold with a second material comprising the electrically insulating second ceramic; applying a pressure to the mold to form a green body; and sintering the green body at a temperature to form a graded integral structure comprising the ion-conducting first ceramic at a first end and the electrically insulating second ceramic at a second end.

EXAMPLES

The following examples illustrate methods and embodiments in accordance with the invention, and as such should not be construed as imposing limitations upon the claims. Unless specified otherwise, all components are commercially available from common chemical suppliers such as Sigma-Aldrich (United States), and the like.

Example 1

A. Preparation of a Laminate Comprising Alpha-Alumina and Beta-Alumina

Figure 10:
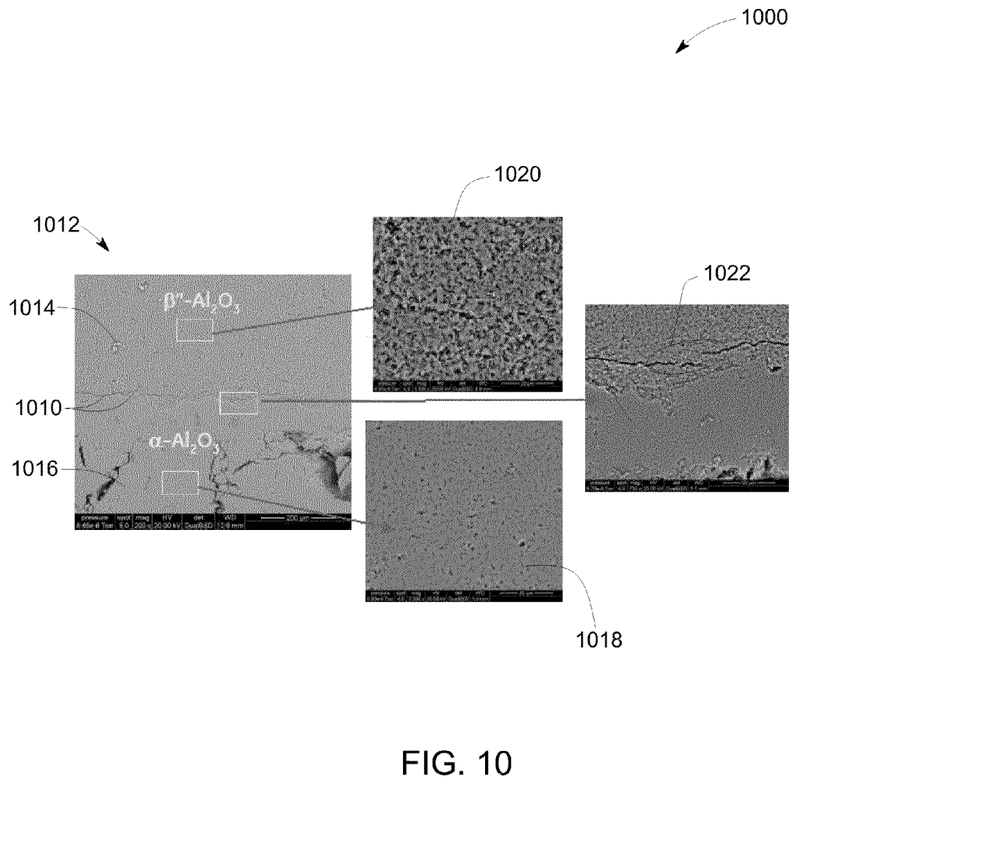
FIG. 10 is a pictorial view showing a layered composite of alpha-alumina and beta-alumina in the absence of a strengthening agent.

A first powder including beta-alumina (2.5 grams) and a second powder including alpha-alumina (2.5 grams) were compressed to form a graded pellet. The beta-alumina used had a particle size of 1.5 micrometers and the alpha-alumina used had a particle size of 0.15 micrometers. The pellet was formed, by compressing the two powders under a pressure of about 150 Mega Pascals. The resultant pellet was sintered at 1580 degrees Centigrade for about 10 minutes to form a graded pellet. Referring to FIG. 10, a layered composite forming the graded pellet including alpha-alumina and beta-alumina is provided. The scanning electron photomicrographs of the layered composite reveal the presence of cracks all along the alpha-alumina and beta-alumina interface 1010. The picture 1012 shows a layer of beta-alumina 1014 and a layer of alpha-alumina 1016. Magnified images of the alpha-alumina portion 1018 and the beta-alumina portion 1020 clearly show a difference in the bulk characteristics of alpha and beta-alumina due to their varying densification behaviors as discussed herein. The magnified image of the interface of the graded pellet clearly shows a crack all along the alpha-alumina and beta-alumina interface.

Figure 11:
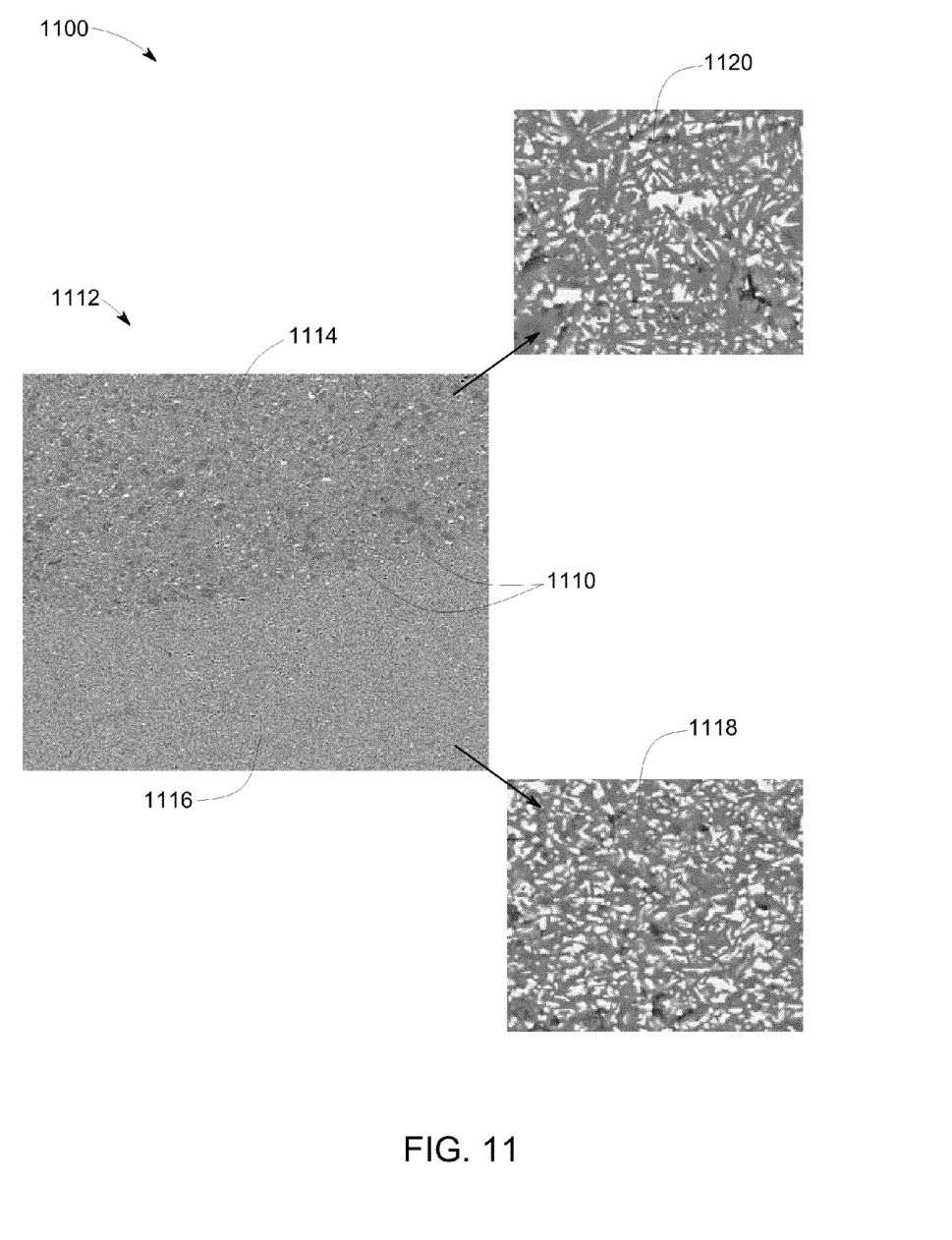
FIG. 11 is a pictorial view showing a layered composite of alpha-alumina and beta-alumina in the presence of a strengthening agent in accordance with and embodiment of the invention.

B. Preparation of a Laminate Comprising Alpha-Alumina, Beta-Alumina, and a Strengthening Agent A first powder including beta-alumina (1.72 grams) and zirconia (0.78 grams), and a second powder including alpha-alumina (1.81 grams) and zirconia (0.68) grams, were compressed to form a graded pellet. The beta-alumina used had a particle size of 1.5 micrometers, the alpha-alumina used had a particle size of 0.15 micrometers and the zirconia had a particle size of 0.6 micrometers. The pellet was formed, by compressing the two powders under a pressure of about 150 Mega Pascals. The resultant pellet was sintered at 1580 degrees Centigrade for about 10 minutes to form a graded pellet. Referring to FIG. 11, a layered composite forming the graded pellet including alpha-alumina and beta-alumina is provided. The scanning electron photomicrographs 1112 of the layered composite reveal a crack-free, homogenous interface all along the alpha-alumina 1116 and beta-alumina 1114 interface 1110. Magnified images of the alpha-alumina portion 1118 and the beta-alumina portion 1120 clearly show negligible difference in the bulk characteristics of alpha and beta-alumina due to their densification behaviors that have been rendered substantially identical by employing zirconia as the strengthening agent as discussed herein.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrolyte separator structure comprising:
a graded integral structure, wherein the graded integral structure comprises a monolithic structure comprising an ion-conducting first ceramic at a first end and an electrically insulating second ceramic at a second end; wherein the electrically insulating second ceramic comprises one or more of alpha-alumina, yttria, yttria stabilized zirconia, yttrium aluminum garnet, magnesia alumina spinel, and yttrium aluminate perovskite;
wherein the difference in the coefficient of thermal expansion of the ion-conducting first ceramic and the electrically insulating second ceramic is less than or equal to about 5 parts per million per degrees Centigrade; and
wherein at least one of the first ceramic or the second ceramic comprises a strengthening agent that comprises an oxide, a nitride, or a carbide of at least one element selected from the group consisting of group IIIA elements, group IIIB elements, group IVB elements, and group IVB elements.

2. The electrolyte separator structure of claim 1, wherein the ion-conducting first ceramic comprises beta-alumina.

3. The electrolyte separator structure of claim 1, wherein about 80 percent to about 99 percent of the graded integral structure, based on the total length of the graded integral structure, comprises the ion-conducting first ceramic.

4. The electrolyte separator structure of claim 1, wherein about 1 percent to about 20 percent of the graded integral structure, based on the total length of the graded integral structure, comprises the electrically insulating second ceramic.

5. The electrolyte separator structure of claim 1, wherein the difference in the coefficient of thermal expansion of the ion-conducting first ceramic and the electrically insulating second ceramic is in a range from about 0.001 parts per million per degrees Centigrade to about 5 parts per million per degrees Centigrade.

6. The electrolyte separator structure of claim 1, wherein both the first ceramic and the second ceramic comprise a strengthening agent.

7. The electrolyte separator structure of claim 1, wherein the strengthening agent is present in the first ceramic in a range from about 1 volume percent to about 50 volume percent based on the volume of the first ceramic.

8. The electrolyte separator structure of claim 1, wherein the strengthening agent is present in the second ceramic in a range from about 1 volume percent to about 50 volume percent based on the volume of the second ceramic.

9. The electrolyte separator structure of claim 1, wherein the ratio of the amount of the strengthening agent present in the first ceramic to the amount of the strengthening agent in the second ceramic is in a range from about 1:0.2 to about 1:5.

10. The electrolyte separator structure of claim 1, wherein the graded integral structure comprises a composition varying in a gradual predetermined manner across a specified length of the structure which forms an interface between the ion-conducting first ceramic and the electrically insulating second ceramic.

11. The electrolyte separator structure of claim 10, wherein the interface between the ion-conducting first ceramic and the electrically insulating second ceramic is free of a sealing material.

* * * * *